United States Patent
Pacchiana et al.

(10) Patent No.: US 7,523,811 B2
(45) Date of Patent: Apr. 28, 2009

(54) METHOD AND SYSTEM FOR MEASURING THE WEAR OF A CERAMIC DISK OF A DISK-BRAKE DISK

(75) Inventors: Giovanni Paolo Pacchiana, Locate (IT); Fabio Micari, Messina (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 24 days.

(21) Appl. No.: 11/710,545

(22) Filed: Feb. 26, 2007

(65) Prior Publication Data
US 2007/0209883 A1   Sep. 13, 2007

Related U.S. Application Data

(63) Continuation of application No. 10/556,501, filed on Nov. 14, 2005, now abandoned.

(30) Foreign Application Priority Data
May 14, 2003   (WO) .................. PCT/IT2003/000290

(51) Int. Cl.
F16D 66/02   (2006.01)
(52) U.S. Cl. ................................. 188/1.11 W; 188/214
(58) Field of Classification Search ............. 188/1.11 L, 188/1.11 W, 1.11 E, 214
See application file for complete search history.

(56) References Cited

U.S. PATENT DOCUMENTS

| | | | | |
|---|---|---|---|---|
| 3,015,950 | A * | 1/1962 | Doctor et al. | 73/86 |
| 5,559,286 | A | 9/1996 | White et al. | |
| 5,637,794 | A * | 6/1997 | Hanisko | 73/121 |
| 5,668,529 | A | 9/1997 | Kyrtsos | |
| 6,360,850 | B1 * | 3/2002 | Odisho et al. | 188/1.11 L |
| 6,450,300 | B1 * | 9/2002 | Kramer | 188/1.11 L |
| 6,477,893 | B1 * | 11/2002 | Djordjevic | 188/1.11 L |
| 6,564,909 | B1 * | 5/2003 | Razzano | 188/1.11 L |
| 2006/0076196 | A1 * | 4/2006 | Palladino | 188/1.11 W |

FOREIGN PATENT DOCUMENTS

FR   2 794 825 A   12/2000

\* cited by examiner

*Primary Examiner*—Melanie Torres
(74) *Attorney, Agent, or Firm*—Hogan & Hartson, LLP

(57) ABSTRACT

The specification describes a method and a system for measuring the wear of a disk of composite ceramic material of a disk brake. The method comprises the following operations: measuring the temperature (T) of the disk at a predetermined frequency (f), calculating a wear increment (delta i) as a function of the measured temperature (T) at every temperature measurement, summing the calculated wear increments (delta i) comparing the sum of the wear increments with a predetermined limiting wear index (i lim) and signalling the eventual overstepping of the limiting wear index (i lim).

10 Claims, 4 Drawing Sheets

METHOD AND SYSTEM FOR MEASURING THE WEAR OF A CERAMIC DISK OF A DISK-BRAKE DISK

This application is a continuation of co-pending application No. 10/556,501, filed Nov. 14, 2005, which is hereby incorporated by reference.

The present invention concerns a method and a system for measuring the wear of a disk-brake disk made of composite ceramic material.

Disks of composite ceramic material (CCM), briefly referred to as ceramic disks, have numerous advantages as compared with traditional metal disks. In particular, they are light, assure great braking efficiency in all conditions of use, are practically not subject to dimensional variations during use and are not consumed to any appreciable extent due to abrasion. Such disks generally have a very long working life, often equal to that of the vehicle on which they are mounted, but are nevertheless subject to wear.

The wear of ceramic disks cannot be assessed and measured by means of the traditional methods on account of the substantial dimensional inalterability of their dimensions and appearance. It has been found by experimental means that their wear depends on the intensity with which the disks are used, that is to say, on how and to what extent they are stressed during their entire working life: gradual and well spaced braking contributes little to wear, while violent and continuous braking makes the wear more rapid.

With a view to assuring safety and making the maximum use of the durability of disk brakes, which—among others—are very costly, there is a strongly felt need for a reliable measure of their wear.

According to the invention, this need is satisfied by putting into practice the method defined in general terms in claim 1 and realizing the system defined in general terms in claim 7.

Figure 1:
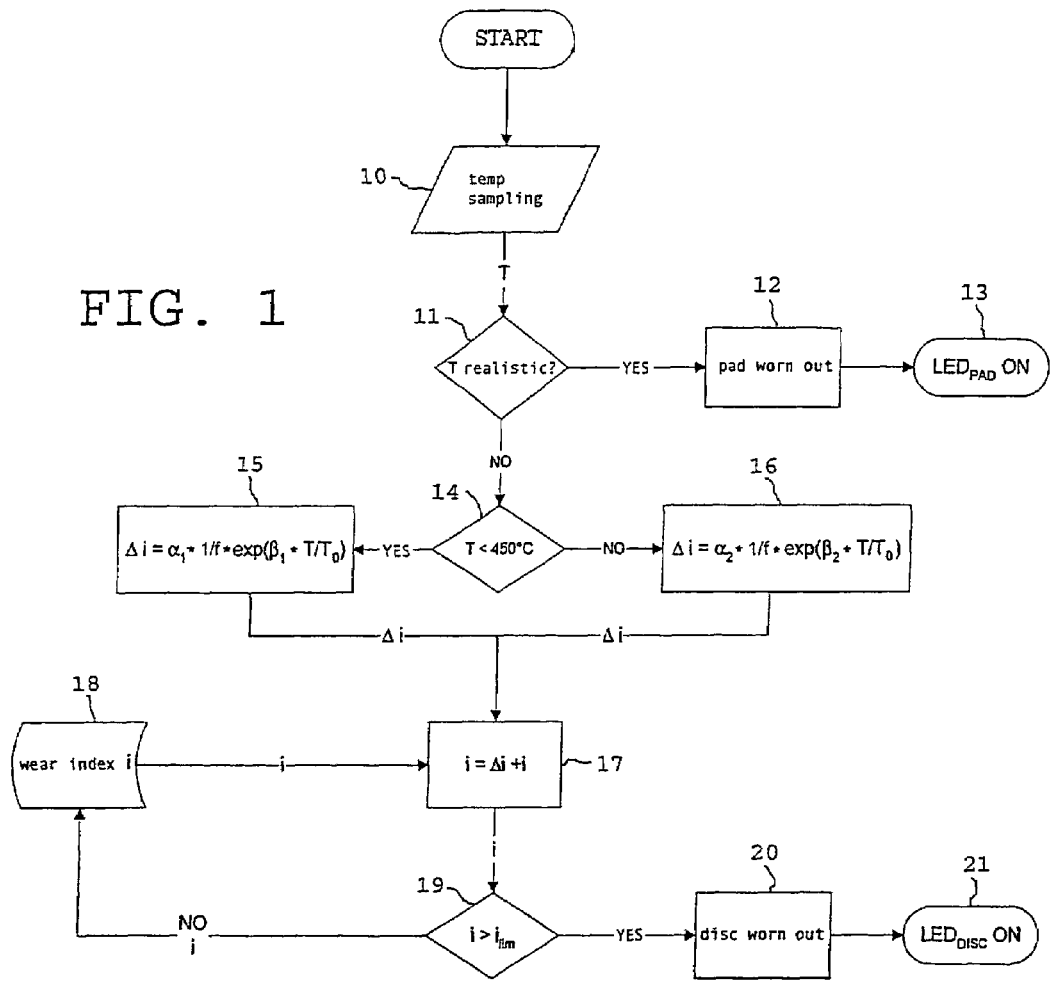
Figure 2:
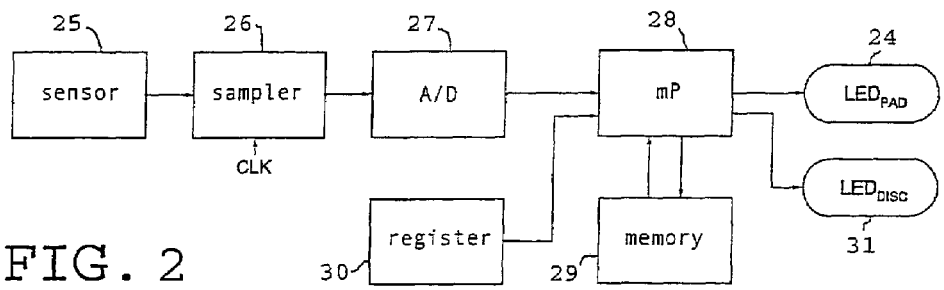
Figure 3:
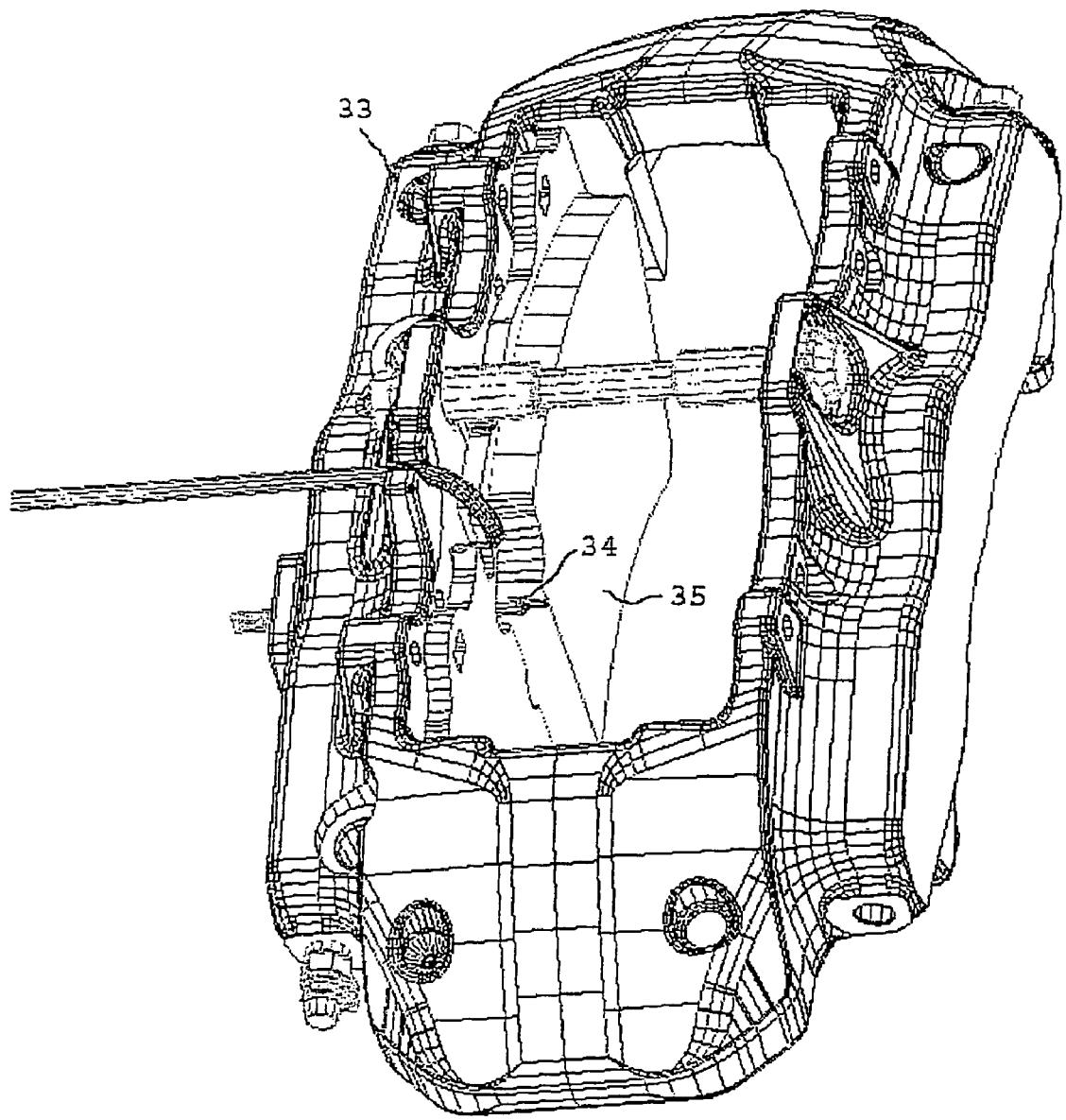
Figure 4:
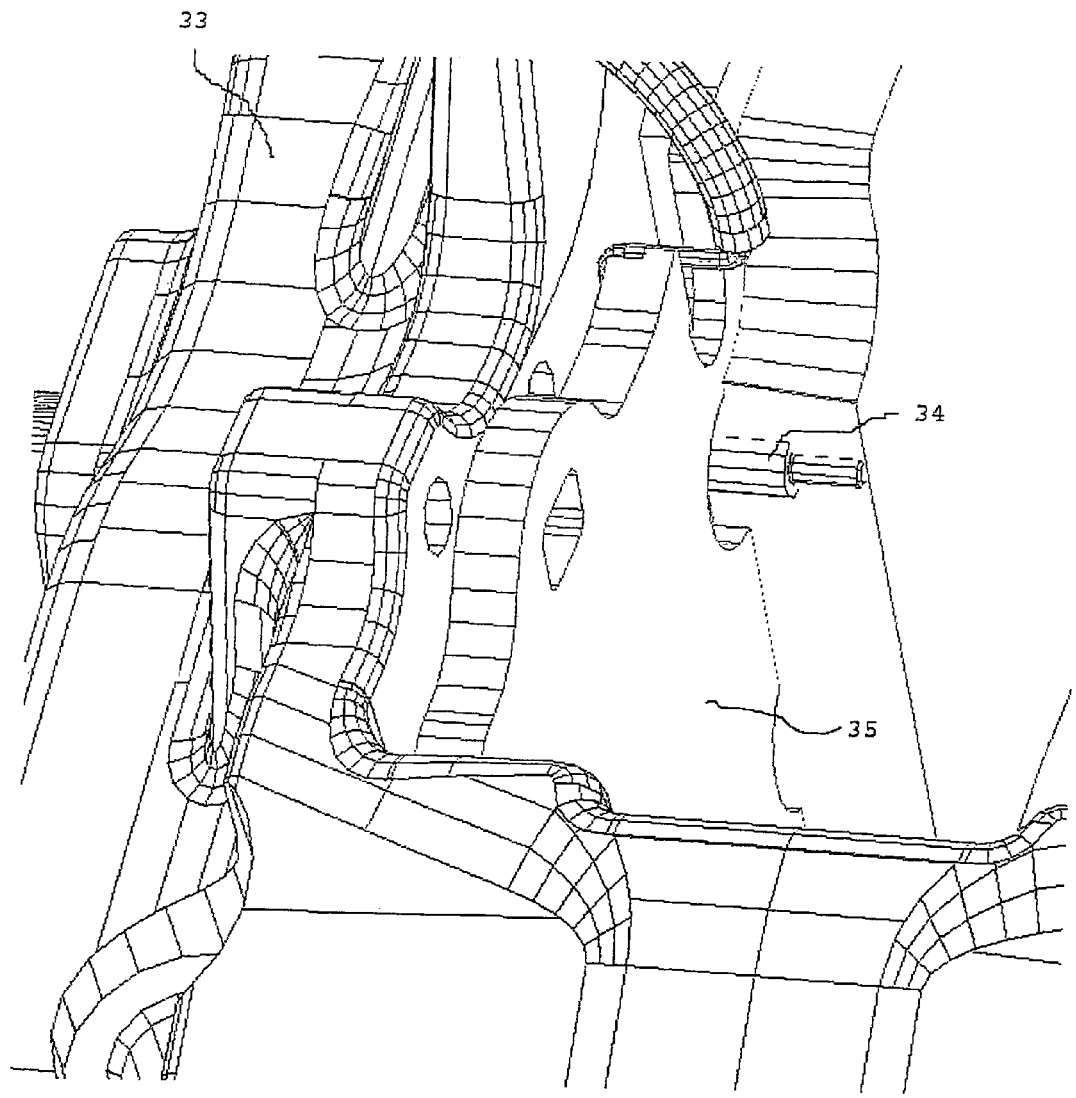
Figure 5:
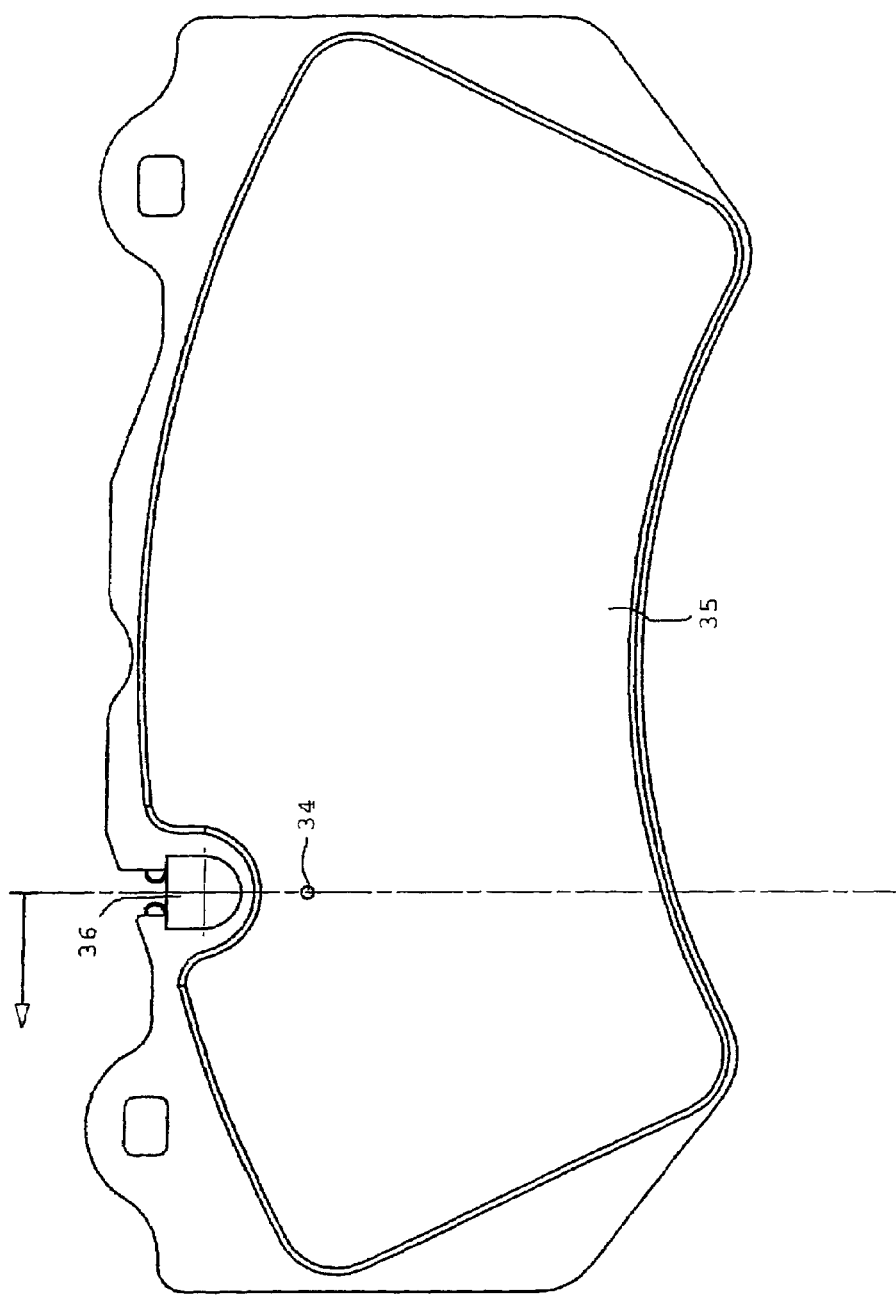
Figure 6:
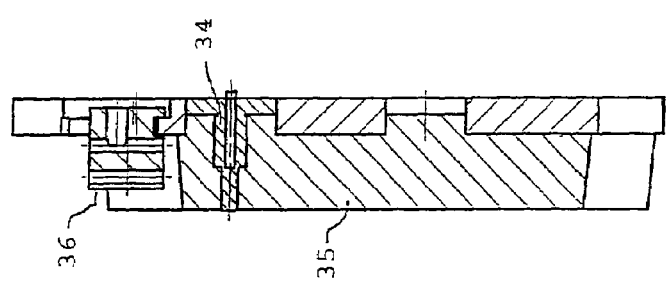

The invention will be better understood from the detailed description about to be given, which is purely by way of example and is not therefore to be understood as limitative in any way, said description making reference to the attached drawings, of which:

FIG. 1 shows a flow scheme that illustrates the method in accordance with the invention, FIG. 2 shows a block diagramme that represents the system in accordance with the invention, FIG. 3 shows a perspective view of a brake caliper—though with a part removed—containing a temperature sensor that can be used with the system in accordance with the invention, FIG. 4 shows a detail, again with a part removed, of the brake caliper of FIG. 3 with a brake pad and a temperature sensor that can be used with the system in accordance with the invention, and FIGS. 5 and 6 show, respectively, a plan view of the pad of the brake caliper of FIG. 3 and a section through it.

Referring to FIG. 1, the measurement of the wear of a ceramic disk is preferably commenced when the engine of the vehicle on the wheel of which the disk is mounted is started up. A temperature sensor continuously indicates the temperature T of the disk. The temperature signal is sampled at a predetermined frequency, comprised—for example—between 5 and 50 Hz, preferably 20 Hz (Block 10), and is examined in Block 11 in order to verify whether it is comprised within a range of realistic values. This verification is essentially carried out with a view to checking the state of the brake pad that acts on the disk: if the pad has been consumed to the point of reaching a limit thickness, the signal will either be absent or lie outside the range and Block 11 will emit a "pad worn" signal (Block 12) that activates an indicator, a LED 13 for example, to signal that the pad has to be replaced.

But if the temperature lies within the range of realistic values, the temperature T will be compared in Block 14 with a predetermined reference temperature $T_r$, 450° C. for example, and then used to obtain a quantity $\Delta i$ that may be called the wear increment. An exponential expression is preferably used for calculating this quantity. An experimentally determined exponential expression that has been used for realizing the method in accordance with the invention is as follows:

$$\Delta i = \alpha * 1/f * \exp(\beta * T/T_0)$$

where $T_0$ is a predetermined temperature constant, preferably comprised between 350° C. and 550° C., $\alpha$ and $\beta$ are constant and predetermined coefficients, and $f$ is the sampling frequency. Both $T_0$ and $\alpha$ and $\beta$ depend essentially on the nature of the disk material.

More particularly, if the comparison shows that T<450° C., the quantity $\Delta i$ is calculated in Block 15 with the constant $\alpha = \alpha_1$ having a predetermined value chosen within the range comprised between 0 and 0.1 and with the constant $\beta = \beta_1$ having a predetermined value chosen within the range comprised between 0 and 4. If the comparison shows that T>=450° C., the quantity $\Delta i$ is calculated in Block 16 with the constant $\alpha = \alpha_2$ having a predetermined value chosen within the range comprised between 0 and 0.01 and with the constant $\beta = \beta_2$ having a predetermined value chosen within the range comprised between 0 and 15.

The wear increment calculated in this manner is then summed in Block 17 with a quantity i. This quantity i is stored in a memory 18 and is constituted by the sum of all the wear increments calculated since the beginning of the working life of the disk. In Block 19 the sum is then compared with a quantity $i_{lim}$ that represents the limiting wear index of the disk. This quantity is once again obtained by experimental means. If the comparison shows that the index $i_{lim}$ has not been attained, the sum $i=\Delta i+i$, the new wear index, is memorized in place of the previous value of i. If, on the other hand, the index $i_{lim}$ has been reached, Block 19 emits a "disk worn" signal (Block 20) that activates an indicator 21, for example, yet another LED.

A system capable of putting into practice the above described measuring method is represented in a schematic manner in FIG. 2.

A temperature sensor 25 associated with a disk brake of a vehicle sends a temperature signal T to a sampling circuit 26. The sampling takes place at a predetermined frequency, for example 20 Hz, determined by a clock signal CLK. The samples of the temperature signal are converted into digital form by an A/D converter 27 and then processed in a processing unit 28. The unit 28 performs the operation described in connection with Block 11 of FIG. 1 to verify whether the temperature signal lies within the range of realistic values and generates an activation signal for a LED indicator 24. The unit 28 is connected to a memory 29 that contains the updated wear index i and a setting register 30 that contains the parameters necessary for calculating the expressions indicated in Blocks 15 and 16 of FIG. 1, i.e. the temperatures $T_r$ and $T_0$, the frequency f and the constant coefficients $\alpha_1$, $\alpha_2$, $\beta_1$, $\beta_2$. The register 30 provides the processing unit 28 also with the limiting wear parameter $i_{lim}$ for carrying out the comparison indicated in Block 19 of FIG. 1. The unit 28 sends an updating signal to the memory 29 when the wear index is smaller than the limiting value and an activation signal to the LED 31 when this limiting value is attained.

It may be convenient to provide a wear measurement system like the one described hereinabove for each of the disk brakes of the vehicle. All the wear measurement systems may form part of the processor aboard the vehicle.

As shown in FIGS. 3 to 6, the temperature sensor may be realized advantageously by means of a thermocouple inside the brake caliper 33 of the disk brake. The thermocouple is mounted inside a support 34, in this case a cylinder, made of a material that is a good heat conductor, copper for example, fixed to a brake pad 35 of the brake caliper. The support 34 is inserted in a hole provided in the brake pad 35 in such a way as just to emerge from its surface that comes into contact with the disk (not shown) during the braking. The support 34 has a somewhat thinner terminal appendix that has a very low thermal inertia to assure an optimal transfer of the disk temperature to the thermocouple. The head of the thermocouple is situated within a blind hole of the support 34 adjacent to the internal end of the terminal appendix. The latter becomes consumed due to abrasion together with the brake pad 35. The leads of the thermocouple are inserted in an insulating sheath that is fixed to the supporting plate of the pad 35 of the brake caliper to form a protuberance, indicated by 36 in FIGS. 5 and 6, that faces the disk during its rotation. The position of the protuberance 36 is chosen in such a way as to enable the sheath to come into contact with the disk and therefore to be gradually consumed due to friction between it and the disk until at least one of the leads of the thermocouple is laid bare and eventually cut. This will happen when the brake pad 35 has become thinned down to the point of making it advisable to change it. The shearing of the lead gives rise to the situation, described in connection with Block 11 of FIG. 1, that is to say, activation of the "pad worn" signal.

The invention claimed is:

1. A method for measuring the wear of a disk of composite ceramic material of a disk brake comprising the following operations: measuring the temperature (T) of the disk at a predetermined frequency (f), at every temperature measurement, calculating a wear increment ($\Delta i$) as a function of the measured temperature (T), summing the calculated wear increments ($\Delta i$), comparing the sum of the wear increments with the predetermined limiting wear index ($i_{lim}$) and signaling the eventual overstepping of the limiting wear index ($i_{lim}$), wherein the operation of calculating a wear increment ($\Delta i$) comprises the following steps: comparing the measured temperature (T) with a predetermined reference temperature ($T_r$) and calculating the wear increment ($\Delta i$) by using a first and a second predetermined function of the temperature when the comparison shows that the measured temperature (T), respectively, does and does not exceed the predetermined reference temperature ($T_r$).

2. A method in accordance with claim 1, wherein both the first and the second predetermined function are exponential functions of the temperature.

3. A method in accordance with claim 2, wherein the first and the second predetermined function are the type: $\Delta i = \alpha * 1/f * \exp(\beta * T/T_0)$
where $\Delta i$ is the wear increment, T is the measured temperature, $T_0$ is a predetermined temperature constant, $\alpha$ is a first predetermined constant coefficient, $\beta$ is a second predetermined constant coefficient, and f is the sampling frequency.

4. A method in accordance with claim 3, wherein the predetermined frequency (f) is a frequency chosen within the range comprised between 5 and 50 Hz, the predetermined reference temperature ($T_r$) is a temperature chosen within the range comprised between 350° C. and 550° C., the predetermined temperature constant ($T_0$) is a temperature chosen within the range comprised between 350° C. and 550° C. and in which the constant coefficient a of the first function is comprised between 0 and 0.1 and the constant coefficient $\beta$ of the first function is comprised between 0 and 4, while in the second function the constant coefficient a is comprised between 0 and 0.01 and the constant coefficient $\beta$ is comprised between and 0 and 15.

5. A method in accordance with claim 1, wherein the limiting wear index ($i_{lim}$) is experimentally obtained.

6. A system for measuring the wear of a disk of composite ceramic material of a disk brake comprising: a sensor for detecting the temperature of the disk, means for sampling the temperature detected by the sensor at a predetermined frequency (f), processing means capable of calculating a wear increment ($\Delta i$) for every sampled temperature and summing the calculated wear increments, means for memorizing the sum of the wear increments, means for comparing the memorized sum with a predetermined limiting wear index ($i_{lim}$) and signaling means for signaling whether the comparison shows that the predetermined limiting wear index ($i_{lim}$) has been exceeded, wherein the operation of calculating a wear increment ($\Delta i$) comprises the following steps: comparing the measured temperature (T) with a predetermined reference temperature ($T_r$) and calculating the wear increment ($\Delta i$) by using a first and a second predetermined function of the temperature when the comparison shows that the measured temperature (T), respectively, does and does not exceed the predetermined reference temperature ($T_r$).

7. A system in accordance with claim 6, wherein the sensor comprises a thermocouple mounted inside a support made of material that is a good conductor of heat fixed to a brake pad of the disk brake.

8. A system in accordance with claim 7, wherein the support of the thermocouple has a terminal appendix of low thermal inertia of which the end just projects beyond the surface of the brake pad that comes into contact with the disk.

9. A system in accordance with claim 8, wherein the thermocouple is housed in a blind hole of the support adjacent to the internal end of the terminal appendix.

10. A system in accordance with claim 7, wherein at least one lead of the thermocouple is inserted in a sheath fixed to the supporting plate of the brake pad that forms a projecting element facing the disk of the disk brake, said projecting element being in a position such that the sheath and the lead may be consumed by friction with the disk when the brake pad has become thinned down to a predetermined limiting thickness.

* * * * *